E. R. BRESLER.
DEMOUNTABLE TIRE CARRYING RIM.
APPLICATION FILED FEB. 9, 1918.
1,289,630.
Patented Dec. 31, 1918.
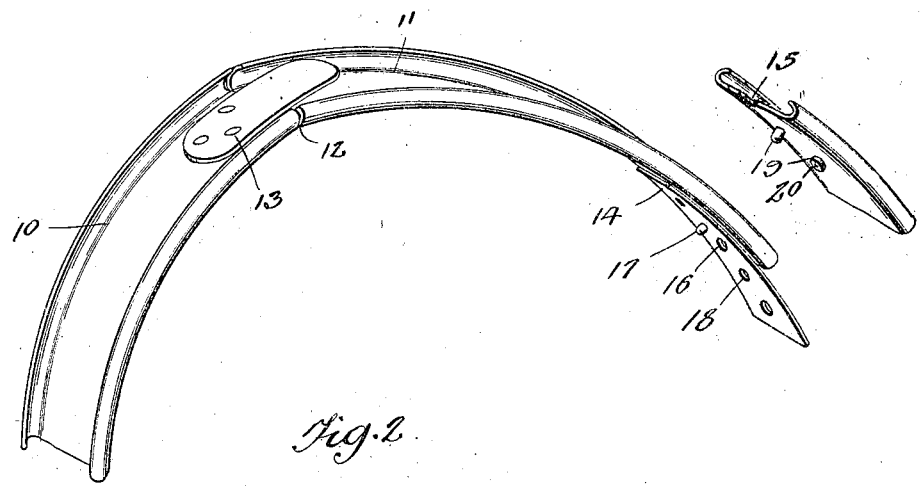
Fig. 1.
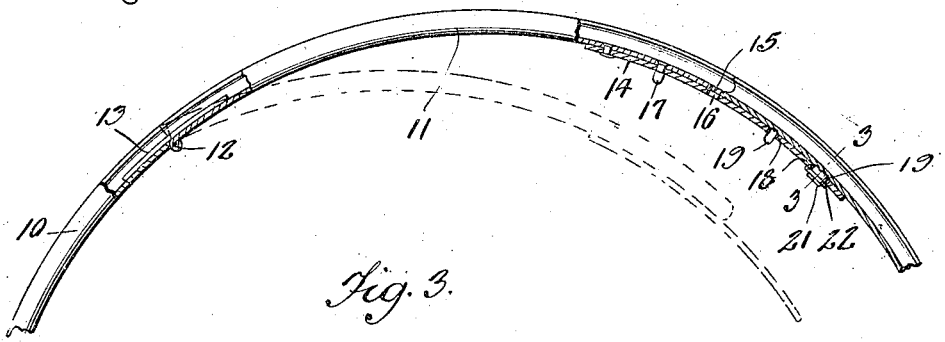
Fig. 2.
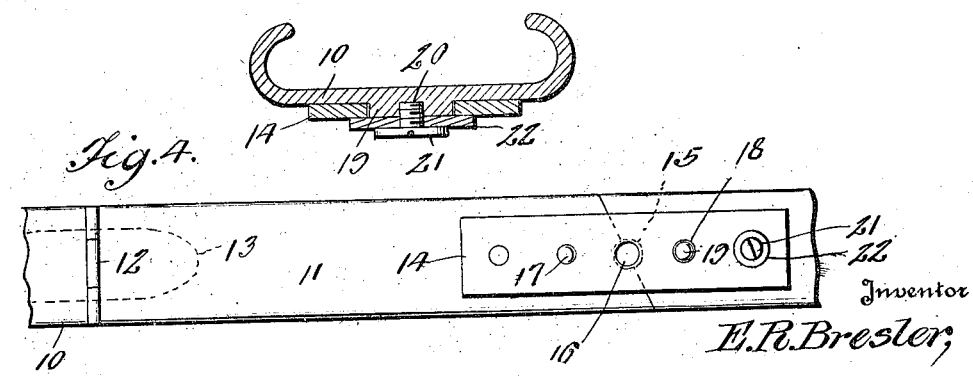
Fig. 3.
Fig. 4.
WITNESSES
Inventor
E. R. Bresler,
By Victor J. Evans
Attorney

UNITED STATES PATENT OFFICE.

EVERETT R. BRESLER, OF AMANDA, OHIO.

DEMOUNTABLE TIRE-CARRYING RIM.

1,289,630.                  Specification of Letters Patent.     Patented Dec. 31, 1918.

Application filed February 9, 1918. Serial No. 216,274.

*To all whom it may concern:*

Be it known that EVERETT R. BRESLER, a citizen of the United States, residing at Amanda, in the county of Fairfield and State of Ohio have invented new and useful Improvements in Demountable Tire-Carrying Rims, of which the following is a specification.

This invention relates to demountable tire carrying rims for use with automobile wheels, and broadly stated, comprehends the provision of the novel construction of means for holding the meeting ends of the rim in face to face contact, yet permitting said ends to be moved away from each other in a manner, so that the tire can be readily and easily removed from the rim, or placed thereon as the occasion may require.

The nature and advantages of the invention will be readily apparent when the following detailed description is read in connection with the accompanying drawing, the invention residing in the construction, combination and arrangement of parts as claimed.

In the drawings forming a part of this specification like numerals of reference indicate similar parts in the several views and wherein;—

Figure 1 shows a perspective view of the adjacent ends of the rim separated.

Fig. 2 shows a side elevation of the rim, with the collapsed position of the hinge section indicated by dotted lines.

Fig. 3 is a sectional view taken on line 3—3 of Fig. 2.

Fig. 4 is a fragmentary plan view of the rim showing the fastening plate in its active position.

Referring more particularly to the drawing in detail, 10 indicates the rim which may be of any desirable cross sectional configuration, including a section 11 which is hingedly connected as at 12 with the rim proper to swing inwardly for the purpose hereinafter described. The rim is of the demountable type used in connection with automobile wheels, and subsequent to the removal of the rim from the felly of the wheel, the section 11 is swung inwardly as shown by dotted lines in Fig. 2 to permit of the tire being easily and quickly removed from the rim. A strip of metal or any other suitable material indicated at 13 has one end secured in any suitable manner to the rim proper, the strip being of suitable length to bridge the joint between the hinge section and the rim proper, to prevent catching of the inner tube between these parts when the tire is placed upon the rim.

Riveted or otherwise suitably secured to the inner side of the hinge section 11 is an elongated plate 14 which projects an appreciable distance beyond the free extremity of the hinge section 11 as shown in Fig. 1. The hinged section of course, constitutes one of the meeting extremities of the rim proper, the plate 14 projecting beyond these sections to overlap the joint between the meeting extremities of the rim. The meeting extremities are cut away as at 15 to accommodate the valve stem of the tire, the cutaway portion 15 defining an opening when the rim is used, and which opening registers with an opening 16 formed in the plate 14 at an appropriate point in its length. One or both of the rivets utilized in securing the plate to the rim proper project beyond the inner side of the plate, being indicated at 17 and are adapted to be received in depressions of the felly of the wheel (not shown) to prevent circumferential movement or creeping of the rim when placed upon the felly. That portion of the plate 14 which overlaps the adjacent extremity of the rim proper, is provided with spaced openings 18 through which the tubular projections 19 are adapted to pass. One of these projections passes beyond the plate, and is adapted to be received in a depression of the felly to prevent the creeping of the latter. The other projection 19 terminates flush with the inner surface of the plate 14, and is provided with an internally threaded bore 20 to receive a threaded fastening element 21 such as a screw or the like for holding the section 11 of the rim in its extended position. A washer 22 is interposed between the head of the fastening element 21 and the hollow projection 19 which receives the latter.

From the foregoing description it is obvious that the screw driver or a similar element is the only thing necessary to remove the fastening element 21 from the projection 19, when it is desired to collapse the rim to facilitate the removal of a tire therefrom or the association of a tire therewith. After the fastening element 21 has been removed, the plate 14 is removed from the projection 19 and in so doing each section 11 of the rim is moved to the position shown by dotted lines in Fig. 2. Inherent quality of material of the rim proper causes the same to slightly contract, so that a tire can be readily separated therefrom.

While it is believed that from the foregoing description that the nature and advantages of the invention will be readily apparent, I desire to have it understood that I do not limit myself to the exact construction and arrangement of parts illustrated, inasmuch as such changes may be resorted to when desired as fall within the scope of what is claimed.

Having thus described the invention what is claimed is:—

A demountable rim of the character described comprising, a main rim section, an adjustable rim section hinged at one end to the adjacent end of the main rim section, a strip secured to the end of the main rim section upon the outer side thereof and extending across the hinged connection of the same with the adjustable rim section, a plate arranged near the free end of the adjustable rim section upon the inner side thereof and having a plurality of openings formed in one end portion thereof, an element serving to attach the opposite end portion of the plate to the free end portion of the adjustable rim section and projecting inwardly beyond the same for a substantial distance to engage within a depression within the felly of the wheel, an inwardly projecting element secured to the opposite end portion of the main rim section and extending through one opening formed in the plate and projecting inwardly beyond the plate to enter a depression in the felly of the wheel, a tubular lug formed upon the inner side of said opposite end portion of the main rim section and extending into the other opening of the plate, a screw operating within the tubular lug, and a washer carried by the screw and extending outwardly beyond the tubular lug.

In testimony whereof I affix my signature.

EVERETT R. BRESLER.